United States Patent
Wuertz et al.

(10) Patent No.: US 7,172,041 B2
(45) Date of Patent: Feb. 6, 2007

(54) DRIVE-BY-WIRE LAWNMOWER

(75) Inventors: Robert M. Wuertz, Pewaukee, WI (US); Terrance G. Benson, Union Grove, WI (US)

(73) Assignee: Textron Inc., Providence, RI (US)

( * ) Notice: Subject to any disclaimer, the term of this patent is extended or adjusted under 35 U.S.C. 154(b) by 22 days.

(21) Appl. No.: 10/972,839

(22) Filed: Oct. 22, 2004

(65) Prior Publication Data

US 2005/0050871 A1 Mar. 10, 2005

Related U.S. Application Data

(62) Division of application No. 10/017,473, filed on Dec. 14, 2001, now Pat. No. 6,808,032.

(51) Int. Cl.
*B60K 17/30* (2006.01)
*B62D 11/02* (2006.01)

(52) U.S. Cl. ............... 180/6.24; 180/6.3; 180/6.48; 180/6.58; 180/315; 180/335; 180/33

(58) Field of Classification Search ........... 180/6.24, 180/6.3, 6.48, 6.58, 315, 335, 33
See application file for complete search history.

(56) References Cited

U.S. PATENT DOCUMENTS

| 3,563,327 A | | 2/1971 | Mier |
| 3,627,070 A | | 12/1971 | Colten |
| 3,645,349 A | * | 2/1972 | Nichter ............... 180/6.48 |
| 3,726,094 A | | 4/1973 | Schaefer |
| 3,771,310 A | | 11/1973 | Cryder et al. |
| 3,774,401 A | * | 11/1973 | Allen .................. 60/420 |
| 3,803,841 A | | 4/1974 | Erickson et al. |
| 3,841,423 A | | 10/1974 | Holtkamp et al. |
| 3,848,690 A | | 11/1974 | Hawkins |
| 3,916,625 A | | 11/1975 | Holtkamp |
| 3,987,626 A | | 10/1976 | Bianchetta |
| 4,031,975 A | * | 6/1977 | Engel ................. 180/6.48 |
| 4,191,270 A | * | 3/1980 | Monteith ............. 180/53.4 |
| 4,553,620 A | | 11/1985 | Eckhardt et al. |
| 4,914,592 A | | 4/1990 | Callahan et al. |
| 5,249,422 A | | 10/1993 | Smith et al. |
| 5,335,750 A | * | 8/1994 | Geringer et al. ....... 180/307 |

(Continued)

FOREIGN PATENT DOCUMENTS

DE 3744419 5/1989

(Continued)

*Primary Examiner*—Lesley D. Morris
*Assistant Examiner*—Marlon Arce-Diaz
(74) *Attorney, Agent, or Firm*—Harness, Dickey & Pierce P.L.C.

(57) ABSTRACT

The mower has at least two independently driven wheels that are each capable of bi-directional rotation. The at least two wheels are independently driven so that operation of the at least two wheels causes the at least two wheels to independently rotate which propels and steers the mower. A microprocessor controls the operation of the at least two wheels in accordance with signals received by the microprocessor. The mower has at least one controller. The at least one controller sends signals to the microprocessor that the microprocessor uses to control the operation of the at least two wheels. The operation of the at least one controller causes the at least two wheels to propel and steer the mower.

36 Claims, 4 Drawing Sheets

U.S. PATENT DOCUMENTS

| | | |
|---|---|---|
| 5,433,066 A | 7/1995 | Wenzel et al. |
| 5,456,333 A | 10/1995 | Brandt et al. |
| 5,518,079 A * | 5/1996 | Zvolanek .................. 180/19.1 |
| 5,529,134 A * | 6/1996 | Yomogita ................... 180/6.2 |
| 6,056,074 A * | 5/2000 | Heal et al. ................ 180/6.48 |
| 6,126,564 A * | 10/2000 | Irikura et al. ................ 475/24 |
| 6,434,917 B1 * | 8/2002 | Bartel ........................ 56/11.3 |
| 6,484,827 B2 * | 11/2002 | Teal et al. ................... 180/6.2 |
| 6,578,656 B2 * | 6/2003 | Samejima et al. .......... 180/291 |
| 6,634,445 B2 * | 10/2003 | Dix et al. .................. 180/6.48 |
| 2002/0005302 A1 | 1/2002 | Hidaka |
| 2002/0053479 A1 | 5/2002 | Wakitani et al. |
| 2002/0062583 A1 | 5/2002 | Wakitani et al. |

FOREIGN PATENT DOCUMENTS

| | | |
|---|---|---|
| EP | 1142775 | 10/2001 |
| EP | 1201488 | 5/2002 |

* cited by examiner

DRIVE-BY-WIRE LAWNMOWER

CROSS-REFERENCE TO RELATED APPLICATIONS

This application is a divisional of U.S. patent application Ser. No. 10/017,473 filed on Dec. 14, 2001 now U.S. Pat. No. 6,808,032. The disclosure of the above application is incorporated herein by reference.

FIELD OF THE INVENTION

The present invention relates to zero turning radius vehicles, such as turf care vehicles, skid steer loaders, and the like, and more specifically, to riding lawn mowers that are driven-by-wire.

BACKGROUND OF THE INVENTION

Riding lawn mowers come in a variety of sizes and configurations. The typical riding lawn mower has an internal combustion engine that provides power to propel the riding lawn mower. In some riding lawn mowers, the internal combustion engine is used to turn a hydraulic pump(s) that supplies a flow of hydraulic fluid that is used to drive wheels on the mower. The hydraulically driven wheels propel the mower. The speed at which the mower is propelled can be controlled by adjusting the rate of flow of the hydraulic fluid to the wheels. The steering of the typical riding lawn mower is performed by a steering wheel that is mechanically linked to wheels on the mower. In the case of a hydraulically driven riding lawn mower, the steering can also be accomplished by adjusting the rate at which wheels on opposite sides of the mower rotate so that the wheels rotate at different rates. The rates at which the wheels rotate is controlled by adjusting the flow rate of the hydraulic fluid to the wheels. The adjusting of the flow rate can cause the wheels to rotate at different speeds and the mower to steer in the direction of the wheel that is rotating at the lower speed.

The typical hydraulically driven riding lawn mower uses a variety of mechanical linkages to control the speed of the mower and to steer the mower. The mechanical linkages are operated by a user of the mower. The user manipulates the mechanical linkages to cause the mower to be propelled and to control the direction in which the mower travels. For example, a steering wheel can be rotated to control the direction in which the wheels are oriented so that the direction in which the mower moves can be controlled. Levers can be mechanically linked to valves to control the operation of the valves. The levers are linked so that movement of the levers causes the valves to adjust the volume and direction of the flow of hydraulic fluid to each of the hydraulically driven wheels. The adjustment of the volume of flow of hydraulic fluid to each of the wheels controls the speed at which the wheels rotate. The levers can be manipulated so that a different volume of hydraulic fluid flows to each of the hydraulically driven wheels and each wheel rotates at a different speed relative to each other which controls the direction in which the mower travels. The adjustment of the direction of the flow of hydraulic fluid to each of the wheels controls the direction in which the wheels rotate and whether the riding lawn mower is propelled in a forward or backward direction.

While the use of mechanical linkages to control the operation of a typical riding lawn mower with hydraulically driven wheels has proved useful, the use of mechanical linkages has drawbacks. For example, adjustments to the control and operation of the lawn mower can be difficult and time consuming. The mechanical linkages may need to be adjusted in length or connected to different attachment points so the control and operation of the mower can be adjusted. Additionally, due to safety concerns about where a person adjusting the mechanical linkages needs to place their hands, some adjustments cannot be made while the mower is operating. Therefore, the results of the adjustments of the mechanical linkages cannot be ascertained until after the mower is in operation again. This can result in an iterative process of starting and stopping the mower and adjusting the mechanical linkages until the desired operation is achieved which may be a long and exhaustive process. Furthermore, it is not always feasible to use mechanical linkages to provide a complex or highly adjustable control scheme for the riding lawn mower. The operation of the mechanical linkages needs to be easy to understand and operate by a user of the mower. As a result, the mechanical linkages are limited to simple and easy movements that facilitate the control and operation of the mower and complex control schemes are difficult to make and may not be feasible to be used by a user of the mower.

Therefore, what is needed is a riding lawn mower that has a control scheme that allows for improved control of the mower while being easy to use and adjust. Such a control scheme should be intuitive to use and allow for adjustments of the controls during the operation of the mower. Furthermore, it would be advantageous if the control scheme were conducive to operation of the mower by a user with physical handicaps.

SUMMARY OF THE INVENTION

The present invention is directed to a riding lawn mower that has the above desired advantageous control scheme. The present invention is directed to an apparatus for providing a riding lawn mower that is driven-by-wire. In one preferred embodiment, the drive-by-wire riding lawn mower has at least two independently driven wheels that are capable of bi-directional rotation. The at least two wheels are independently driven so that operation of the at least two wheels causes the at least two wheels to independently rotate. The independent rotation of the at least two wheels propels and steers the mower. A microprocessor controls the operation of the at least two wheels in accordance with signals received by the microprocessor. The mower has at least one controller. The at least one controller sends signals to the microprocessor that the microprocessor uses to control the operation of the at least two wheels so that operation of the at least one controller causes the at least two wheels to propel and steer the mower.

Optionally, but preferably, the at least two wheels are hydraulically driven and the mower further comprises at least one hydraulic pump that provides a flow of hydraulic fluid to drive the at least two wheels. At least one proportional servo valve can be provided that controls a direction and speed of the flow of hydraulic fluid to the at least two wheels. The at least one valve is controlled by a microprocessor and adjusts the flow of hydraulic fluid to the at least two wheels in response to signals received from the microprocessor. The adjusting of the flow of hydraulic fluid by the at least one valve controls the direction and speed of rotation of the at least two wheels so that the mower can be propelled and steered. Even more preferably, the at least one hydraulic pump is one of a plurality of hydraulic pumps. A first hydraulic pump of the plurality hydraulic pumps provides a flow of hydraulic fluid to the first wheel of the at least two wheels. A second hydraulic pump of the plurality hydraulic pumps provides a flow of hydraulic fluid to a second wheel of the at least two wheels. The at least one proportional servo valve is one of a plurality of servo valves. A first valve of the plurality of valves adjusts the flow of hydraulic fluid from the first hydraulic pump to the first wheel in response to signals received from the microprocessor and a second valve of the plurality of valves adjusts the flow of hydraulic fluid from the second hydraulic pump to the second wheel in response to signals received from the microprocessor.

Optionally, the mower can further comprise a biasing switch. The biasing switch is selectively operable to adjust the operation of the at least two wheels so that the mower can track a desired path. The biasing switch sends signals to the microprocessor in response to operation of the biasing switch that the microprocessor uses to control the operation of the at least two wheels.

Optionally, the mower may further comprise a mode switch. The mode switch is selectively operable between a work position and a transport position to adjust the operation of the at least two wheels. The work position corresponds to normal operation of the mower. The transport position corresponds to high speed operation of the mower. The mode switch sends a signal to the microprocessor that the microprocessor uses to control the operation of the at least two wheels. The microprocessor operates the mower in a normal mode when the mode switch is in the work position. The microprocessor reduces a rate at which the at least two wheels steer the mower when the mode switch is in the transport mode so that the mower can be safely turned during high speed operation.

Optionally, the mower may further comprise a gain controller. The gain controller is selectively operable and allows a user of the mower to adjust the response of the mower caused by operation of the at least one controller. Operation of the gain controller causes the gain controller to send signals to the microprocessor and inform the microprocessor on how to interpret signals from the at least one controller. The microprocessor adjusts the operation of the at least two wheels in response to signals received by the microprocessor from the at least one controller based upon signals received from the gain controller.

In an alternate embodiment, the at least one controller further comprises a first and second controller. The first controller sends signals to the microprocessor that the microprocessor uses to control the operation of a first wheel of the at least two wheels so that the operation of the first controller causes the first wheel to rotate. The second controller send signals to the microprocessor that the microprocessor uses to control the operation of a second wheel of the at least two wheels so that operation of the second controller causes the second wheel to rotate. Preferably, the first and second controllers are each selectively movable between forward and reverse positions. Movement of the first controller toward the forward position causes the first wheel to rotate in a direction that corresponds to propelling the mower in a forward direction while movement of the first controller toward the reverse position causes the first wheel to rotate in a direction that corresponds to propelling the mower in a backward direction. Movement of the second controller toward the forward position causes the second wheel to rotate in a direction that corresponds to propelling the mower in a forward direction while movement of the second controller toward the reverse position causes the second wheel to rotate in a direction that corresponds to propelling the mower in a backward direction.

Preferably, each controller has a neutral position disposed between the forward and reverse positions. Positioning of the first and second controllers in the neutral positions causes the respective first and second wheels to not be driven. Even more preferably, the first and second controllers are each biased to the neutral positions so that the first and second controllers return to the neutral positions when no force is being applied to the first and second controllers. Optionally, but preferably, movement of the first and second controllers from the neutral positions toward the forward and reverse positions causes a speed of rotation of the respective first and second wheels to increase in proportion to the movement of the first and second controllers from the neutral positions. Preferably, the proportional increase in the speed of rotation of the at least two wheels in response to movement of the first and second controllers from the neutral positions toward the forward positions is greater than the proportional increase in the speed of rotation of the at least two wheels in response to movement of the first and second controllers from the neutral positions toward the reverse positions. The difference in the proportional increases in the speed of rotation makes the mower capable of being propelled faster in the forward direction than in the backward direction.

In a different alternate embodiment, the at least one controller further comprises first and second controllers. The first controller sends signals to the microprocessor that the microprocessor uses to control the operation of the at least two wheels. The signals from the first controller inform the microprocessor of whether the mower is to be propelled in a forward or backward direction. The second controller sends signals to the microprocessor that the microprocessor uses to control the operation of the at least two wheels. The signals from the second controller inform the microprocessor of a direction in which the mower is to be steered. Preferably, the first and second controllers are selectively moveable. The first controller is selectively moveable between forward and reverse positions. Movement of the first controller toward the forward position causes the at least two wheels to rotate in a direction that corresponds to propelling the mower in a forward direction. Movement of the first controller toward the reverse position causes the at least two wheels to rotate in a direction that corresponds to propelling the mower in a backward direction. The second controller is selectively moveable between left and right positions. Movement of the second controller toward the left position causes the at least two wheels to rotate at different rates so that the mower turns to the left. Movement of the second controller toward the right position causes the at least two wheels to rotate at different rates so that the mower turns to the right.

Preferably, the first controller has a neutral position disposed between the forward and reverse positions. Positioning of the first controller in the neutral position causes the at least two wheels to not be driven. Even more preferably, the first controller is biased to the neutral position so that the first controller is positioned in the neutral position when no force is being applied to the first controller. Movement of the first controller from the neutral position toward the forward and reverse positions causes a speed of rotation of the at least two wheels to increase in proportion to the movement of the first controller from the neutral position. The proportional increase in the speed of rotation of the at least two wheels in response to movement of the first controller from the neutral position toward the forward position is greater than the proportional increase in the speed of rotation of the at least two wheels in response to movement of the first controller from the neutral position toward the reverse position. The difference in the proportional increases in response to movement of the first controller allows the mower to be propelled faster in the forward direction than in the backward direction.

The first controller can be a joystick that moves linearly between the forward and reverse positions. Alternatively, the first controller can be a foot pedal that rotates about an axis between the forward and reverse positions.

Preferably, the second controller has a neutral position disposed between the left and right positions. Positioning of the second controller in the neutral position causes the second controller to not affect a rate at which each of the at least two wheels rotate. Even more preferably, the second controller is biased to the neutral position so that the second controller is positioned in the neutral position when no force is being applied to the second controller. Movement of the second controller from the neutral position toward the left and right positions causes the difference in the rate of rotation of the at least two wheels to increase in proportion to the movement of the second controller from the neutral position.

Optionally, but preferably, the second controller is selectively moveable between extreme left and extreme right positions. The extreme left and extreme right positions are disposed beyond the respective left and right positions so that the second controller must move past the left and right positions to reach the respective extreme left and extreme right positions. Movement of the second controller past the left position toward the extreme left position causes the mower to counter steer left. Movement of the second controller past the right position toward the extreme right position causes the mower to counter steer right. Preferably, movement of the second controller past the left and right positions toward the respective extreme left and extreme right positions causes a speed of the counter steer to increase in proportion to the movement past the left and right positions. Preferably, movement of the second controller past the left and right positions toward the respective extreme left and extreme right positions provides a tactile sensation so that an operator of the mower will feel the tactile sensation prior to the mower counter steering.

The second controller can be a steering wheel that rotates. Rotation of the steering wheel causes the second controller to move between the extreme left and extreme right positions. Alternatively, the second controller can be a joystick that moves linearly between the extreme left and extreme right positions.

In an alternative embodiment, a drive-by-wire dual path hydraulically driven riding lawn mower comprises first and second hydraulic pumps. The first and second hydraulic pumps provide respective first and second flows of hydraulic fluid. There are first and second hydraulically driven wheels that operate independently and are capable of bi-directional rotation. The first and second wheels are independently rotated by the respective first and second flows of hydraulic fluid. The independent rotation of the first and second wheels propel and steer the mower. The microprocessor controls the operation of the first and second wheels by controlling the first and second flows of hydraulic fluid to the respective first and second wheels in accordance with signals received by the microprocessor. At least one controller sends signals to the microprocessor that the microprocessor uses to control the operation of the first and second wheels. The operation of the at least one controller causes the first and second wheels to propel and steer the mower. Preferably, the mower further comprises first and second proportional servo valves. The first and second valves control a direction and volume of flow of the respective first and second flows of hydraulic fluid in response to signals received from the microprocessor. The controlling of the direction and volume of flow of the first and second flows of hydraulic fluid controls a direction and speed of rotation of the respective first and second wheels.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7 is an enlarged partial view of the foot pedal controller of the drive-by-wire lawn mower of FIG. 5.

DETAILED DESCRIPTION OF THE PREFERRED EMBODIMENTS

The following description of the preferred embodiment(s) is merely exemplary in nature and is in no way intended to limit the invention, its application, or uses.

Figure 1:
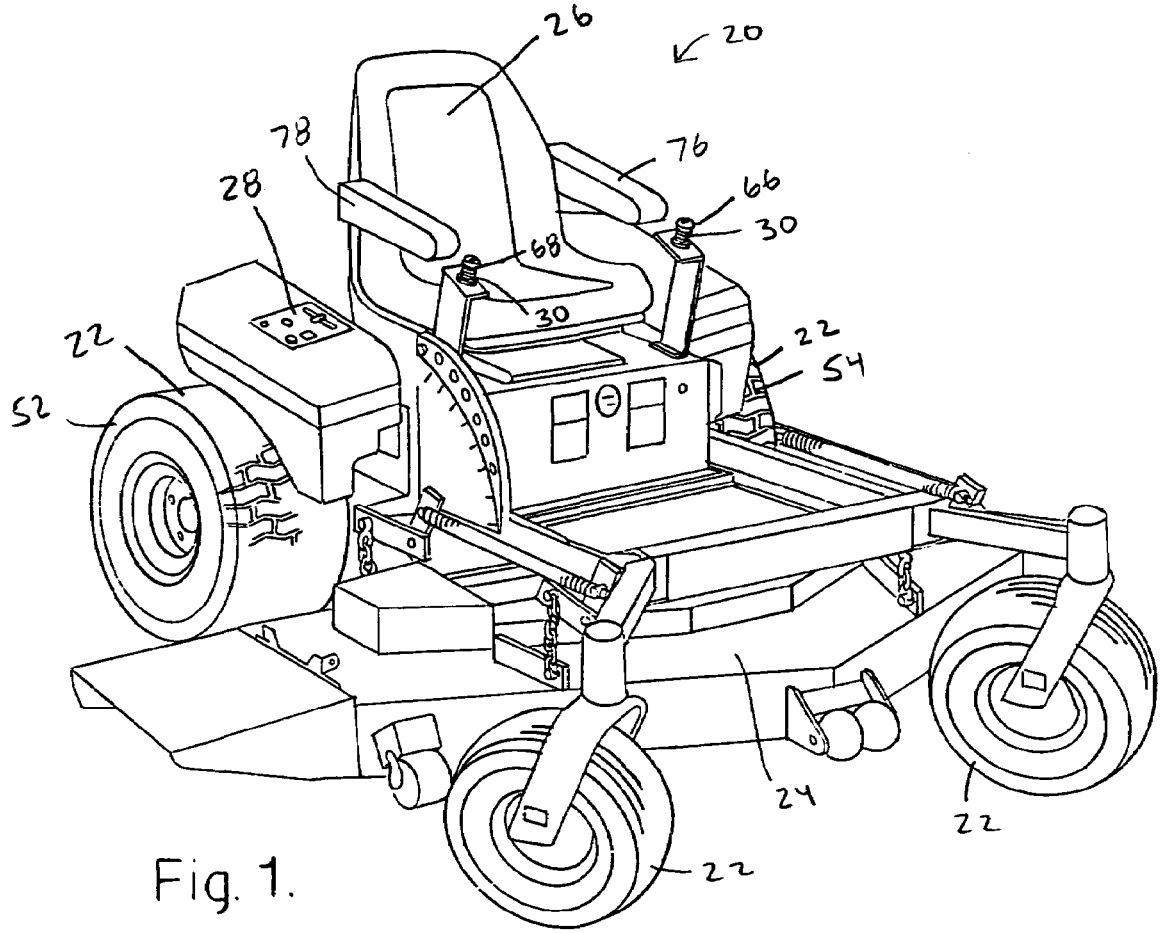
FIG. 1 is a perspective view of a zero turning radius vehicle, in the form of a drive-by-wire lawn mower, according to the principles of the present invention.
Figure 4:
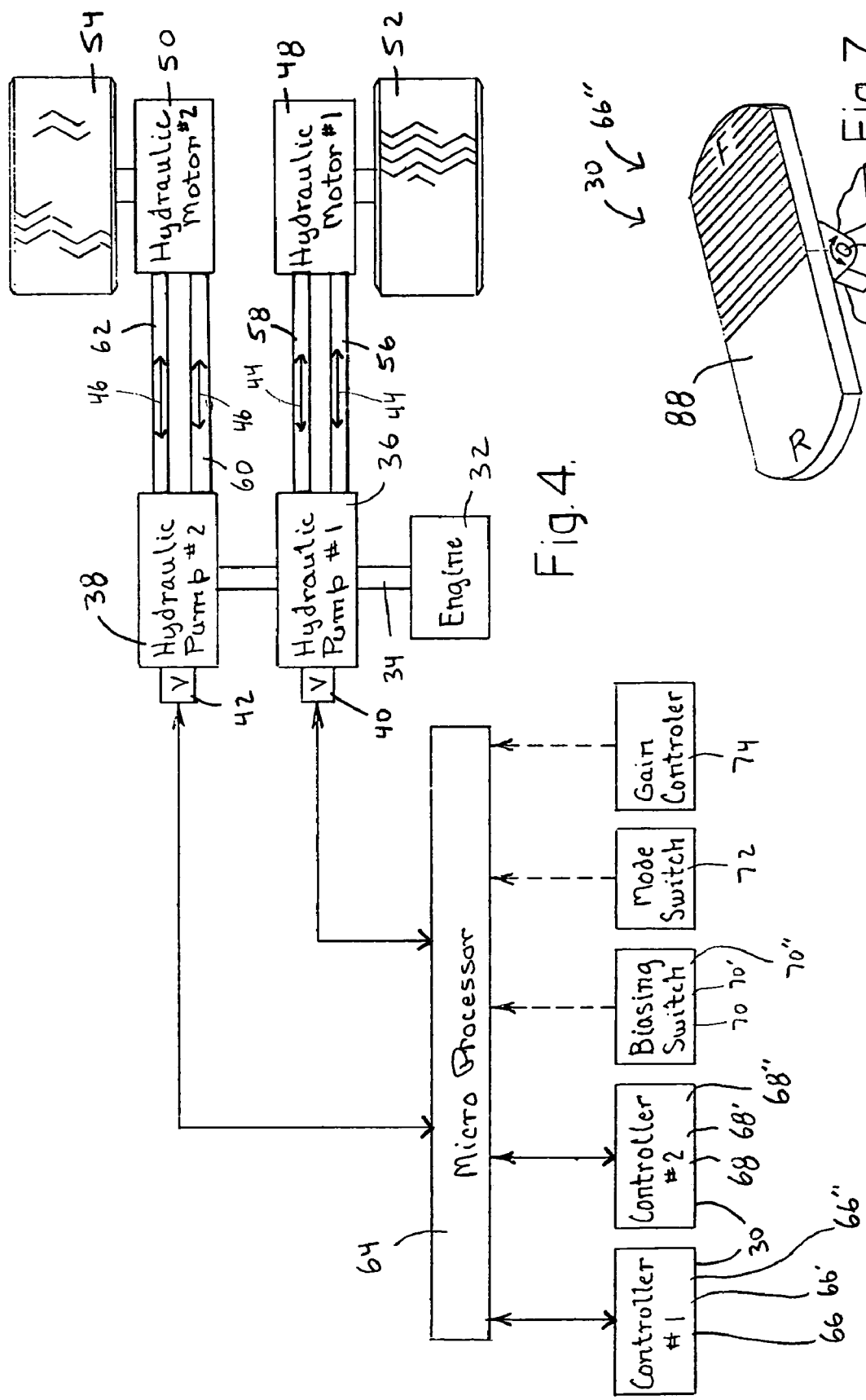
FIG. 4 is a simplified schematic diagram showing the hydraulic circuit and the electronic control circuit for the drive-by-wire lawn mower of FIGS. 1 and 5.

Referring to FIG. 1, there is shown a zero turning radius vehicle, in the form of drive-by-wire riding lawn mower 20, in accordance with a preferred embodiment of the present invention. While the zero turning radius vehicle is illustrated and described as being a drive-by-wire riding lawn mower 20, it should be understood that the principles of the present invention are applicable to other zero turning radius vehicles, including but not limited to skid steer loaders, other turf care vehicles, and the like. Zero turning radius vehicles are generally defined as vehicles having two or more wheels capable of independent bi-directional rotation so that the zero turning radius vehicle can perform counter steering operations. That is, the two or more independent wheels of a zero turning radius vehicle are capable of being simultaneously rotated in differing directions (i.e. one wheel rotating clockwise while the other wheel rotates counter clockwise) so that the vehicle can execute a zero radius turn. Therefore, it should be understood that the principles of the invention can be applied to zero turning radius vehicles that are not riding lawn mowers. The mower 20 generally comprises a plurality of wheels 22, a mower deck 24, a seat 26, a control panel 28, and one or more controllers 30. Referring now to FIG. 4, the mower 20 has an internal combustion engine 32 that provides power to the mower 20. The internal combustion engine 32 is a conventional internal combustion engine 32 and it has a horizontal output shaft 34. The output shaft 34 drives first and second hydraulic pumps 36, 38 in tandem. The first and second hydraulic pumps 36, 38 are swash plate pumps, as is known in the art. The first and second hydraulic pumps 36, 38 have respective first and second proportional servo valves 40, 42 which are electrically operated. The first and second valves 40, 42 control the swash plate (not shown) of the respective first and second hydraulic pumps 36, 38. The first and second hydraulic pumps 36, 38 provide first and second flows of hydraulic fluid 44, 46 to respective first and second hydraulic motors 48, 50. The first and second hydraulic motors 48, 50 are connected to respective first and second hydraulically driven wheels 52, 54. The first and second driven wheels 52, 54 operate independently of each other and are capable of bi-directional rotation, as is known in the art. The direction of rotation of the first and second driven wheels 52, 54 is dependent upon the direction of flow of the respective first and second flows of hydraulic fluid 44,46.

The first hydraulic pump 36 is connected to the first hydraulic motor 48 by first and second hydraulic lines 56, 58. The first flow of hydraulic fluid 44 flows between the first hydraulic pump 36 and the first hydraulic motor 48 via the first and second hydraulic lines 56, 58. The second hydraulic pump 38 is connected to the second hydraulic motor 50 by third and fourth hydraulic lines 60, 62. The second flow of hydraulic fluid 46 flows between the second hydraulic pump 38 and the second hydraulic motor 50 via the third and fourth hydraulic lines 60, 62. The first and second flows of hydraulic fluid 44, 46 can flow between the respective first and second hydraulic pumps 36, 38 and the respective first and second hydraulic motors 48, 50 in any direction. That is, the first flow of hydraulic fluid 44 can flow from the first hydraulic pump 36 to the first hydraulic motor 48 via the first hydraulic line 56 and return from the first hydraulic motor 48 to the first hydraulic pump 36 via the second hydraulic line 58 or, conversely, the first flow of hydraulic fluid 44 can flow from the first hydraulic pump 36 to the first hydraulic motor 48 via the second hydraulic line 58 and return from the first hydraulic motor 48 to the first hydraulic pump 36 via the first hydraulic line 56. Likewise, the second flow of hydraulic fluid 46 can flow from the second hydraulic pump 38 to the second hydraulic motor 50 via the third hydraulic line 60 and return from the second hydraulic motor 50 to the second hydraulic pump 38 via the fourth hydraulic line 62 or, conversely, the second flow of hydraulic fluid 46 can flow from the second hydraulic pump 38 to the second hydraulic motor 50 via the fourth hydraulic line 62 and return from the second hydraulic motor 50 to the second hydraulic pump 38 via the third hydraulic line 60. The first and second hydraulic pumps 36, 38 are connected to a hydraulic fluid reservoir (not shown), as is known in the art.

The direction of flow of the first and second flows of hydraulic fluid 44, 46 is dependent upon the position of the swash plates (not shown) in the respective first and second hydraulic pumps 36, 38. As was mentioned above, the first and second valves 40, 42 control the swash plates in the respective first and second hydraulic pumps 36, 38. Therefore, the direction of flow of the first and second flows of hydraulic fluid 44, 46 are determined by the operation of the respective first and second valves 40, 42. When it is desired to rotate the first and/or second driven wheels 52, 54 in a direction that corresponds to propelling the mower 20 in a forward direction, the first and/or second valves 40, 42 adjust the swash plates in the respective first and/or second hydraulic pumps 36, 38 so that the first and/or second flows of hydraulic fluid 44, 46 flow from the first and/or second hydraulic pumps 36, 38 to the respective first and/or second hydraulic motors 48, 50 via the respective first and/or third hydraulic lines 56, 60. When it is desired to rotate the first and/or second driven wheels 52, 54 in a direction corresponding to propelling the mower 20 in a backward direction, the first and/or second valves 40, 42 adjust the swash plate in the respective first and/or second hydraulic pumps 36, 38 so that the first and/or second flows of hydraulic fluid 44, 46 flow from the respective first and/or second hydraulic pumps 36, 38 to the respective first and/or second hydraulic motors 48, 50 via the second and/or fourth hydraulic lines 58, 62. In this manner, the first and second valves 40, 42 can control the direction of rotation of the respective first and second driven wheels 52, 54.

Along with controlling the direction of flow of the first and second flows of hydraulic fluid 44, 46, the first and second valves 40, 42 also control the volume of flow of the respective first and second flows of hydraulic fluid 44, 46 to the respective first and second hydraulic motors 48, 50. The first and second valves 40, 42 can adjust the angle of the swash plates, as is known in the art, in the respective first and second hydraulic pumps 36, 38 to control the volume of flow of the first and second flows of hydraulic fluid 44, 46 between a maximum volume that corresponds to the maximum angle of the swash plates to a zero volume which corresponds to a neutral position of the swash plates. The volume of flow of the first and second flows of hydraulic fluid 44, 46 determine the speed of rotation of the respective first and second driven wheels 52, 54. Therefore, the first and second valves 40, 42 can control both the direction and speed of rotation of the respective first and second driven wheels 52, 54.

The first and second valves 40, 42 can move the swash plates in the respective first and second pumps 36, 38 between a maximum forward orientation wherein the first and second flows of hydraulic fluid 44, 46 are maximum volumes of flow that rotate the respective first and second driven wheels 52, 54 in a direction corresponding to propelling the mower 20 in a forward direction, a neutral orientation wherein the first and second flows of hydraulic fluid 44, 46 are zero and the first and second driven wheels 52, 54 are not driven by the first and second flows of hydraulic fluid 44, 46, and a maximum backward orientation wherein the first and second flows of hydraulic fluid 44, 46 are maximum volumes of flow that rotate the respective first and second driven wheels 52, 54 in a direction corresponding to propelling the mower 20 in a backward direction. Because the first and second valves 40, 42 can be independently operated, the first and second valves 40, 42 provide independent control of each of the driven wheels 52, 54 so that the mower 20 can be propelled at a variety of speeds in a forward direction and at a variety of speeds in a backward direction. Additionally, because the first and second valves 40, 42 can independently adjust the volume of flow of the respective first and second flows of hydraulic fluid 44, 46 to the respective first and second driven wheels 52 54, the respective first and second driven wheels 52, 54 can be caused to rotate at different speeds and the mower 20 can be steered. That is, by causing the first and second driven wheels 52, 54 to rotate at different speeds, the mower 20 will be propelled in a direction toward the slower rotating wheel. The independent operation of the first and second valves 40, 42 can also allow the mower 20 to operate in a counter steering mode. The counter steering mode corresponds to the first and second driven wheels 52, 54 being rotated in opposite directions so that the mower 20 can make extremely sharp turns.

The mower 20 also has conventional safety features. For example, the seat 26 has a user present switch (not shown) which actuates only when a sufficiently heavy object, such as a user of the mower 20, is sitting in the seat 26. In addition, a typical mechanical brake (not shown) is also provided. The brake can be used for parking the mower 20. For safety reasons, the brake must be on when the engine 32 is started. The brake and the user present switch are interconnected so that if the user present switch is not activated and the parking brake is off the engine 32 will stop, as is known in the art.

The above described operation and capabilities of the mower 20 are conventional and well known in the art. It should be understood that while the invention is shown in the figures and is discussed as being a mower 20 that is propelled and steered by hydraulically driven wheels 52, 54 it should be understood that other means of independently driving the first and second driven wheels 52, 54 can be employed without departing from the scope of the invention as defined by the claims. For example, the first and second driven wheels 52, 54 can be independently driven by DC motors whose operation can be controlled by the one or more controllers 30 and the control panel 28 and still be within the scope of the invention. Therefore, other means of independently driving the first and second driven wheels 52, 54, as will be apparent to those skilled in the art, can be employed and still be within the scope of the invention as defined by the claims.

Referring now to FIG. 4, the first and second valves 40, 42 are controlled by a microprocessor 64. The microprocessor 64 sends signals to the first and second valves 40, 42 that the first and second valves 40, 42 use to control the operation of the swash plates in the respective first and second hydraulic pumps 36, 38. The microprocessor 64 thereby controls the first and second flows of hydraulic fluid 44, 46 to the respective first and second hydraulic motors 48, 50 so that the microprocessor 64 can control the speed and direction of rotation of the first and second driven wheels 52, 54. The microprocessor 64 thereby controls the direction in which the mower 20 is propelled and the steering of the mower 20. The microprocessor 64 can be positioned on the mower 20 in any convenient location.

The microprocessor 64 controls the operation of the mower 20 in response to signals that the microprocessor 64 receives from various components of the mower 20. For example, the microprocessor 64 receives signals from the one or more controllers 30, which are preferably first and second controllers 66, 68. Optionally, the mower 20 can also have one or more biasing switch(es) 70, a mode switch 72 and a gain controller 74 that send signals to the microprocessor 64 that the microprocessor 64 uses to control the operation of the mower 20, as will be discussed in more detail below.

Figure 2A:
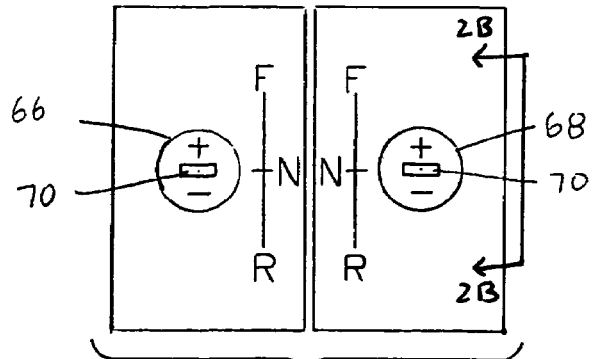
FIG. 2A is an enlarged partial view of the controllers of the drive-by-wire lawn mower of FIG. 1.

The first and second controllers 66, 68, as can be seen in FIG. 1, are positioned in front of the respective left and right arms 76, 78 of the mower 20. The first and second controllers 66, 68 can then be easily reached and operated by a user of the mower 20. In a preferred embodiment, as can be seen in FIG. 2A, the first and second controllers 66, 68 are each independently selectively moveable between forward, neutral and reverse positions. The first controller 66 is used to control the operation of the first driven wheel 52 and the second controller 68 is used to control the operation of the second driven wheel 54. The first and second controllers 66, 68 send signals to the microprocessor 64 that vary depending upon the position of the first and second controllers 66, 68. That is, as the first and second controllers 66, 68 are moved toward the forward position, the first and second controllers 66, 68 independently send signals to the microprocessor 64 that instructs the microprocessor 64 to cause the respective first and second driven wheels 52, 54 be rotated in a direction that corresponds to propelling the mower 20 in a forward direction. Conversely, when the first and second controllers 66, 68 are moved toward the reverse direction, the first and second controllers 66, 68 independently send signals to the microprocessor 64 that instruct the microprocessor 64 to cause the respective first and second driven wheels 52, 54 to rotate in a direction corresponding to propelling the mower 20 in a backward direction. When the first and second controllers 66, 68 are positioned in neutral positions the first and second controllers 66, 68 independently send signals to the microprocessor 64 that instructs the microprocessor 64 to not drive the first and second driven wheels 52, 54 so that the mower 20 remains at rest. Preferably, the first and second controllers 66, 68 are both biased to the neutral position so that if a user of the mower 20 releases the first and/or second controller 66, 68 the microprocessor 64 ceases to cause the respective first and/or second driven wheels 52, 54 to be driven.

Preferably, the movement of the first and second controllers 66, 68 from neutral positions toward the forward or reverse positions causes the speed of rotation of the respective first and second driven wheels 52, 54 to increase in proportion to the movement of the respective first and second controllers 66, 68 from the neutral positions. In this manner, the speed at which the first and second driven wheels 52, 54 rotate can be controlled by the movement of the respective first and second controllers 66, 68 from the neutral positions. Preferably, the proportional increase in the speed of rotation of the first and second driven wheels 52, 54 in response to the movement of the respective first and second controllers 66, 68 from the neutral positions toward the forward positions is greater than the proportional increase in the speed of rotation of the first and second driven wheels 52, 54 in response to the movement of the respective first and second controllers 66, 68 from the neutral positions toward the reverse positions. This enables the mower 20 to be propelled faster in the forward direction than in the backward direction. This is an added safety feature that prevents the operation of the mower 20 in the backward direction at a high speed. The speed at which the mower 20 is propelled in either the forward or backward directions can be independently set to not exceed predetermined speeds. The microprocessor 64 can be programmed to control the movement of the first and second valves 40, 42 in response to movement of the respective first and second controllers 66, 68 so that the maximum movement of the swash plates in the first and second hydraulic pumps 36, 38 is limited. Limiting the maximum movement of the swash plates in the first and second hydraulic pumps 36, 38 limits the speed at which the respective first and second driven wheels 52, 54 are rotated. The microprocessor 64 thereby controls the speed at which the first and second driven wheels 52, 54 can rotate and the speed at which the mower 20 is propelled.

Figure 2B:
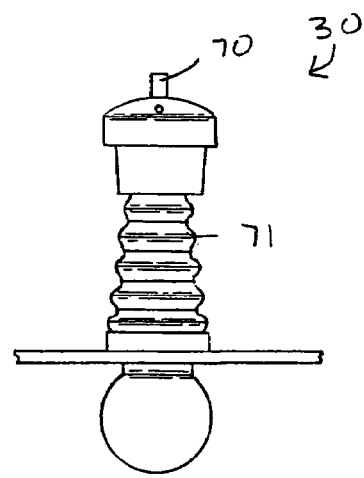
FIG. 2B is an enlarged side elevation view of one of the controllers of FIG. 2A along line 2B.

As is known in the art, dual path hydraulically driven vehicles can have tracking problems. For example, when the first and second controllers 66, 68 are in the same positions relative to the neutral positions, the first and second flows of hydraulic fluid 44, 46 may not be equal due to variations in the first and second hydraulic pumps 36, 38 the first and second valves 40, 42 and/or the swash plates within the first and second hydraulic pumps 36, 38. Therefore, the first and second driven wheels 52, 54 may be rotating at different speeds when the first and second controllers 66, 68 are in the same positions relative to the neutral positions. In this situation, the mower 20 will have a tendency to steer toward the wheel that is rotating at the lower speed and not track properly. The tracking problem also occurs when the mower 20 is being used on a hillside where the mower 20 will typically wish to go down hill. To compensate for this tracking problem, the first and/or second controllers 66, 68 can be optionally provided with biasing switch(es) 70. As can be seen in FIG. 2B, the biasing switch 70 rotates about a pivot point 80. Preferably, the biasing switches have indicia that indicate "+" and "−". The movement of the biasing switch 70 toward the "+" or "−" directions fine tunes the gain adjustment or proportional response in the microprocessor 64 in response to movement of the first and second controllers 66, 68 from the neutral positions. In this manner, if the first driven wheel 52 is rotating faster than the second driven wheel 54 when the first and second controllers 66, 68 are in the same positions relative to the neutral positions, the biasing switch 70 on the first controller 66 can be pivoted toward the "−" position until the first and second driven wheels 52, 54 are rotating at the same speed and the mower 20 is tracking properly or, alternatively, the biasing switch 70 on the second controller 68 can be pivoted towards the "+" position and held there until the first and second driven wheels 52, 54 are rotating at the same speed and the mower 20 is tracking properly. The fine tuning of the gain by pivoting of the biasing switches 70 allows for fine tuning of the control of the mower 20 in response to different situations encountered by the mower 20 during its operation. The fine tuning of the gain can thereby be performed by operation of one or more biasing switches 70. The mower 20 can, therefore, be provided with a single biasing switch 70 or multiple biasing switches 70. Preferably, the biasing switch 70 is biased to return to a neutral position when the user of a lawn mower 20 is no longer pivoting the biasing switch 70 along the pivot point 80.

Preferably, the first and second controllers are joysticks. The joysticks used on the mower 20 are conventional and well known in the art. For example, the joy sticks can be joysticks sold by OEM Controls, Inc. such as the Digisensor. The joysticks send pulses that correspond to the positions of the joysticks to the microprocessor 64 that microprocessor 64 uses to control the first and second driven wheels 52, 54. Each joystick preferably has a spring return to center feature that biases the joystick to a neutral position. The sensing of the joystick in its central position is done by a micro-switch which is operated by a cam. The switch is actuated anytime the joystick is in a position other than the central or neutral position. The spring return to center feature can be accomplished by a simple mechanical helical spring (not shown) that is mounted to the joystick. A weather boot 71 can also be provided along the base of the joystick to prevent foul weather from entering the mechanical components of the joysticks.

While the first and second controllers 66, 68 have been and will continue to be described as preferably being joysticks, it should be understood that the first and second controllers 66, 68 can take a variety of forms and still be within the scope of the invention as defined by the claims. The variety of forms in which the first and second controllers 66, 68 can be configured will be apparent to those skilled in the art. For example, the first and second controllers 66, 68 can be slides which slide along a radial path between forward and reverse positions and that send signals to the microprocessor 64 indicating the position of the slide controllers relative to a neutral position and still be within the scope of the invention. Therefore, the present invention should not be limited to the use of joysticks for the first and second controller 66, 68.

Figure 3:
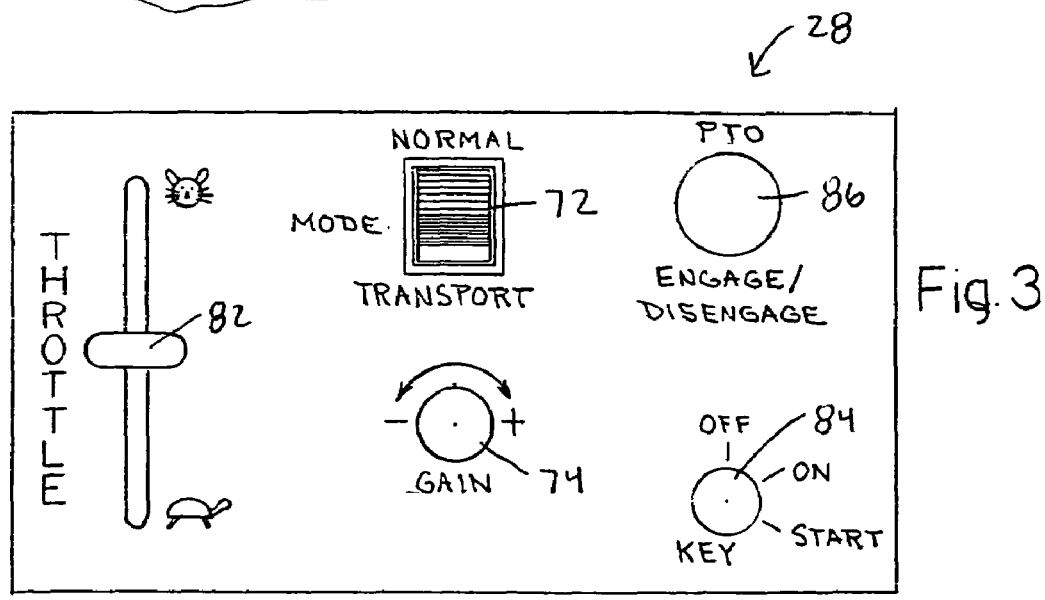
FIG. 3 is a plan view of the control panel of the drive-by-wire lawn mower of FIG. 1.

The mower 20 has a control panel 28 that is shown in FIG. 3. The control panel 28 has a variety of switches that control the function and operation of the mower 20. A throttle 82 is located on the control panel 28 that controls the speed at which the internal combustion engine 32 operates. A key switch 84 is also located on the control panel 28 and turns the mower 20 on and off and also starts the mower 20. The PTO switch 86 can be selectively operated to engage and disengage the PTO (not shown). The optionally provided gain controller 74 is also located on the control panel 28. The gain controller 74 is selectively rotatable to adjust the gain that the microprocessor 64 uses in responding to signals received from the first and second controllers 66, 68. The gain controller 74 can be increased or decreased by selectively rotating the gain controller 74 in the direction indicated by the "+" and "−" indicia respectively. The microprocessor 64 uses the input from the gain controller 74 to control the operation of the first and second driven wheels 52, 54 in response to signals received from the respective first and second controllers 66, 68. The adjustment of the gain controller 74 thereby enables a user of the mower 20 to adjust the sensitivity of the first and second controllers 66, 68 so that a customized feel or setting can be established for the user of the mower 20.

While the gain controller 74 is shown as being a rotatable controller, it should be understood that the gain controller 74 can take a variety of forms, as will be apparent to those skilled in the art, and still be within the scope of the invention as defined by the claims. For example, the gain controller 74 can be a switch that pivots like the preferred embodiment for the biasing switch 70 and still be within the scope of the invention. It should be further understood that the gain controller 74 does not need to be located on the control panel 28 to be within the scope of the invention. The gain controller 74 can be located in a variety of positions on the mower 20 and be within the scope of the invention as defined by the claims. However, it is preferred that the gain controller 74 be located at a position on the mower 20 that is easily accessible by a user of the mower 20 while the mower 20 is in operation so that the gain controller 74 can be adjusted by a user during the operation of the mower 20.

The optional mode switch 72 is also preferably located on the control panel 28. The mode switch 72 is selectively moveable between normal and transport settings. The mode switch 72 sends signals to the microprocessor 64 that the microprocessor 64 uses to control the operation and steering of the mower 20. More specifically, when the mode switch 72 is positioned in the normal position, the lawn mower 20 functions as has been described above. However, when the mode switch 72 is positioned in the transport position, the mower 20 is allowed to travel at a higher speed. When in the transport position, the microprocessor 64 decreases the rate at which the mower 20 can be steered so that when the mower 20 is operating at high speed, the mower does not suddenly steer in one direction or another in response to signals received from the first and second controllers 66, 68 and present an unsafe or hazardous situation for a user of the mower 20. In other words, when the mode switch 72 is in the transport position, the microprocessor 64 prevents the mower 20 from making abrupt movements that may disrupt a user from his/her seated position on the mower 20 and prevent possible injury to the user.

The transport position corresponds to when it is desired to move the mower 20 at a high speed from one location to another. It is not expected that the mower 20 will be used to mow turf while being operated in the transport mode. The transport position corresponds to allowing the mower 20 to travel at a faster speed with less sensitive steering than in a normal mode. When the mower 20 is operated in the transport mode, the microprocessor can be programmed to prevent the mower 20 from performing a counter steering operation or to only allow a counter steering operation below a predetermined speed.

Figure 2C:
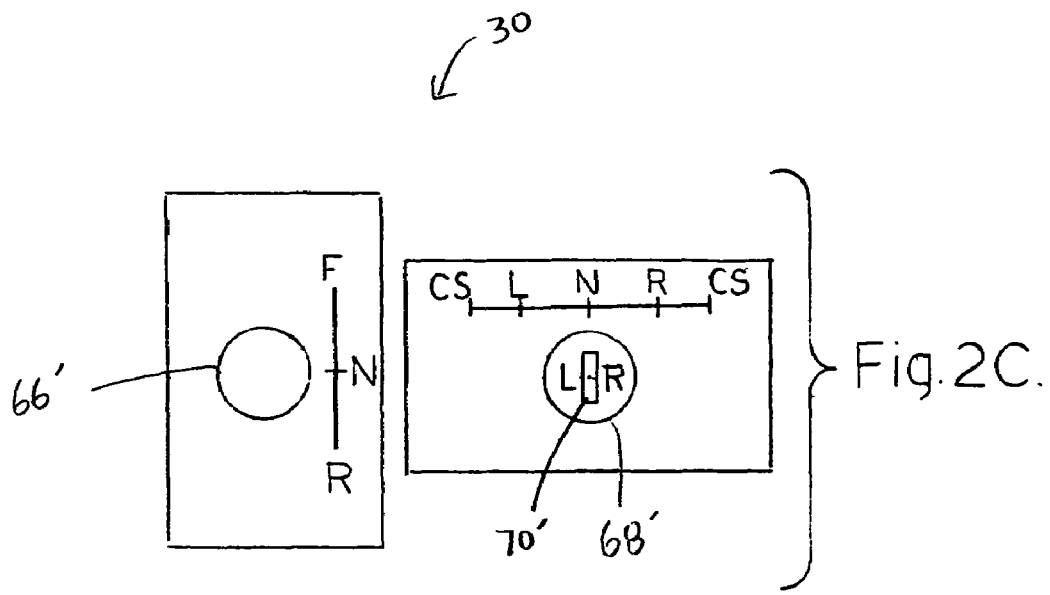
FIG. 2C is an enlarged partial view of an alternate embodiment for the controllers of the drive-by-wire lawn mower of FIG. 1.

In an alternate preferred embodiment, the one or more controllers 30, as can be seen in FIG. 2C, are first and second controllers 66', 68'. The first controller 66' is preferably positioned adjacent the left arm 76 of the mower 20 and the second controller 68' is preferably positioned adjacent the right arm 78 of the mower 20. The first controller 66' sends signals to the microprocessor 64 that the microprocessor 64 uses to control the operation of the first and second driven wheels 52, 54. The signals from the first controller 66' inform the microprocessor 64 of whether the mower 20 is to be propelled in a forward or backward direction. The first controller 66' is moveable between forward and reverse positions and has a neutral position interposed between the forward and reverse positions. Preferably, the controller 66' is biased towards the neutral position so that when no force is being applied to the first controller 66' the first controller 66' is in the neutral position. Movement of the first controller 66' toward the forward position causes the first and second driven wheels 52, 54 to rotate in a direction that corresponds to propelling the mower 20 in a forward direction and, conversely, movement of the first controller 66' toward the reverse position causes the first and second driven wheels 52, 54 to rotate in a direction that corresponds to propelling the mower 20 in a backward direction. When the first controller 66' is positioned in the neutral position, the first and second driven wheels 52, 54 are not driven and the mower 20 is not propelled. Preferably, the first controller 66' is a joystick, as was discussed above.

Preferably, movement of the first controller 66' from a neutral position toward the forward or reverse positions causes a speed of rotation of the first and second driven wheels 52, 54 to increase in proportion to the movement of the first controller 66' from the neutral position. Even more preferably, the proportional increase in the speed of rotation of the first and second driven wheels 52, 54 in response to movement of the first controller 66' from the neutral position toward the forward position is greater than the proportional increase in the speed of rotation of the first and second driven wheels 52, 54 in response to movement of the first controller 66' from the neutral position toward the reverse position. The differences in the proportional increases in the speed of rotation of the first and second driven wheels 52, 54 in response to the first controller 66' being moved toward the forward position as opposed to the reverse position enables the mower 20 to be propelled at a higher speed in the forward direction than in the backward direction.

The steering of the mower 20 is performed by the second controller 68'. The second controller 68' sends signals to the microprocessor 64 that the microprocessor 64 uses to control the operation of the first and second driven wheels 52, 54. The signals from the second controller 68' inform the microprocessor 64 of a direction in which the mower 20 is to be steered. The second controller 68' is selectively moveable between left and right positions and has a neutral position interposed between the left and right positions. Movement of the second controller 68' from the neutral position toward the left position causes the first and second driven wheels 52, 54 to rotate at different rates so that the mower 20 turns to the left and, conversely, movement of the second controller 68' from the neutral position toward the right position causes the first and second driven wheels 52, 54 to rotate at different rates so that the mower 20 turns to the right. When the second controller 68' is positioned in the neutral position, the first and second driven wheels 52, 54 should rotate at the same rate so that the mower 20 travels in a straight line. In order to compensate for tracking problems that may be experienced by the mower 20, that were discussed above, the second controller 68' preferably has a biasing switch 70' that is selectively moveable between left and right positions. Movement of the biasing switch 70' toward the left position causes the microprocessor to adjust the valve controlling the flow of hydraulic fluid to the driven wheel on the left side of the mower 20 so that the driven wheel on the left side of the mower rotates at a faster speed so that the tracking of the mower 20 can be corrected. Conversely, when the biasing switch 70' is moved toward the right position, the microprocessors 64 adjust the valve that controls the flow of hydraulic fluid to the driven wheel on the right side of the mower 20 so that the driven wheel on the right side of the mower rotates at a faster speed so that tracking of the mower 20 can be corrected. Because the flow of hydraulic fluid to the driven wheels has a maximum volume, a situation may occur wherein the volume of flow to one of the driven wheels cannot be increased in response to movement of the biasing switch 70'. In this situation, the microprocessor 64 instead of increasing the volume of flow to one of the driven wheels will decrease the volume of flow to the opposite driven wheel so that the tracking can be corrected. For example, when the biasing switch 70' is moved towards the left position and the flow of hydraulic fluid to the driven wheel on the left side of the mower 20 cannot be increased, the microprocessor 64 will adjust the valve that controls the flow of hydraulic fluid to the driven wheel on the right side of the mower so that the flow of hydraulic fluid to the driven wheel on the right side of the mower is decreased and the driven wheel on the right side of the mower rotates at a lower speed so that the tracking of the mower 20 can be corrected. The converse is also true if the biasing switch 70' were selectively moved to the right position and the driven wheel on the right side of the mower was already receiving a maximum flow of hydraulic fluid. The biasing switch 70' in conjunction with the microprocessor 64 thereby allow the tracking of the mower 20 to be corrected by adjusting the volume of flow of the hydraulic fluid to the driven wheels.

Preferably, the second controller 68' is biased to the neutral position so that when no force is being applied to the second controller 68', the second controller 68' will be in the neutral position. Preferably, the movement of the second controller 68' from the neutral position towards the right or left positions increases the speed at which the mower 20 turns to the right or left respectively. That is, the movement of the second controller 68' from the neutral position toward the left and right positions causes the difference in the rate of rotation of the first and second driven wheels 52, 54 to increase in proportion to the movement of the second controller 68' from the neutral position.

Optionally, but preferably, the second controller 68' is selectively moveable between extreme left and extreme right positions. The extreme left position corresponds to the mower 20 counter steering to the left. The extreme right position corresponds to the mower 20 counter steering to the right. The extreme left and extreme right positions are disposed beyond the respective left and right positions so that the second controller 68' must move pass the left and right positions to reach the respective extreme left and extreme right positions. As can be seen in FIG. 2C, the extreme left position and the extreme right position are indicated by "CS" (counter steer) indicia to the left and right of the "L" and "R" indicia respectively. Movement of the second controller 68' pass the left position toward the extreme left position causes the mower 20 to counter steer left and, conversely, movement of the second controller 68' pass the right position toward the extreme right position causes the mower 20 to counter steer right.

Preferably, the movement of the second controller 68' pass the left and right positions toward the respective extreme left and extreme right positions causes a speed of the counter steering to increase in proportion to the movement of the second controller 68' pass the left and right positions. Optionally, but preferably, the second controller 68' provides a tactile sensation to a user of the mower 20 when the second controller 68' is moving pass the left or right positions and into a counter steering operation. The tactile sensation provides a warning for the user of the mower 20 prior the mower 20 performing a counter steering operation so that the user can be prepared for the counter steering operation of the mower 20. The tactile sensation can be provided in a variety of ways, as will be apparent to those skilled in the art. For example, the second controller 68' can be a force feed back controller or joystick and the microprocessor 64 provides feed back to the second controller 68' that changes resistance to movement of the second controller 68' pass the left and right positions. Cammed surfaces can also be used along with a retaining mechanism such as a spring or elastomeric material that increases the resistance to movement of the second controller 68' as the second controller 68' passes the right or left positions. Optionally, a tactile sensation can be provided for the entire range of motion of the second controller 68' with a marked change in the tactile sensation occurring prior to the movement of the second controller 68' into a counter steering position. Preferably, the second controller 68' is a joystick that moves linearly between the extreme left and extreme right positions. However, as was discussed above, the second controller 68' can come in a variety of forms and still be within the scope of the invention as defined by the claims.

Figure 5:
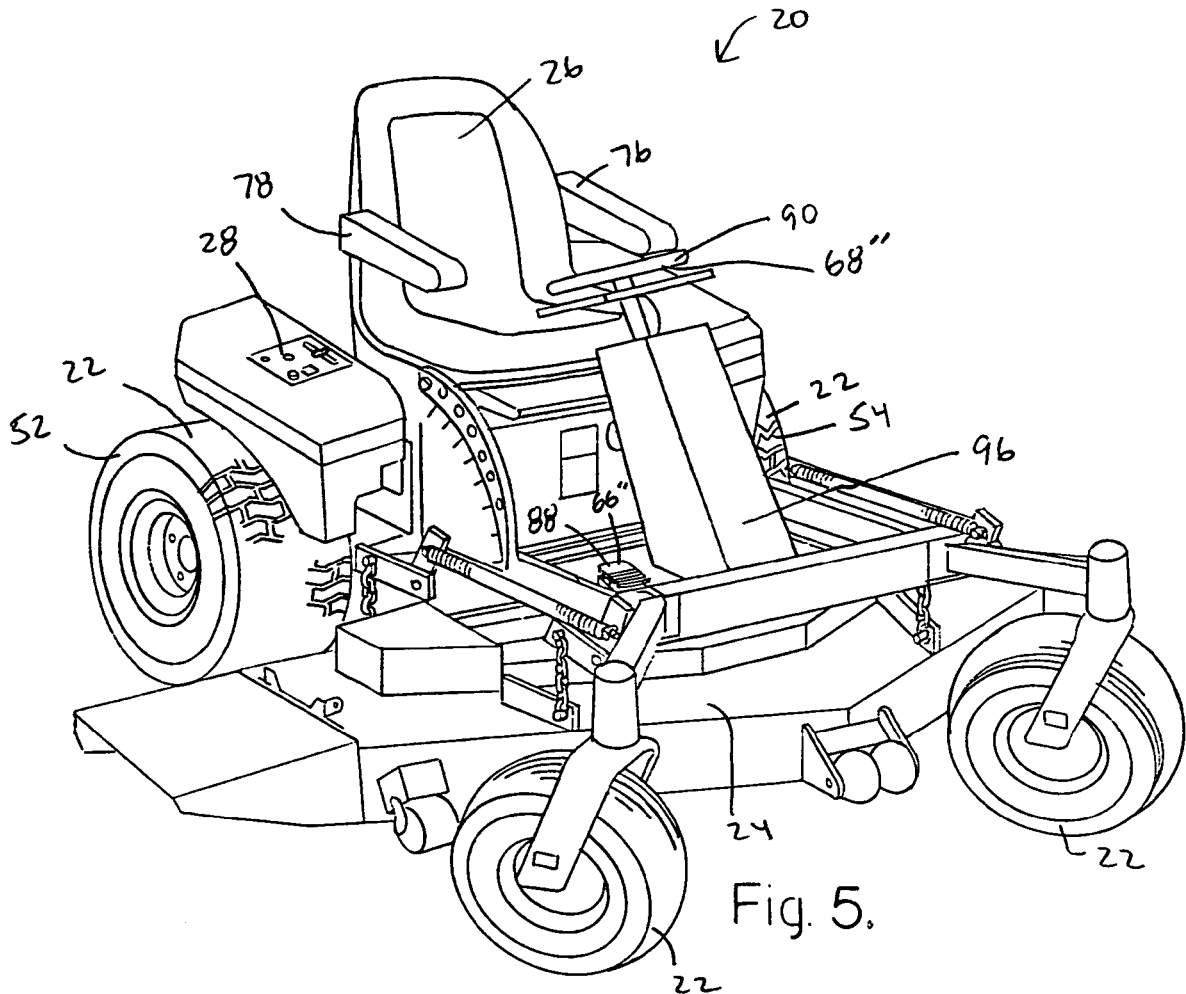
FIG. 5 is an alternate embodiment of a drive-by-wire lawn mower of the present invention.
Figure 6:
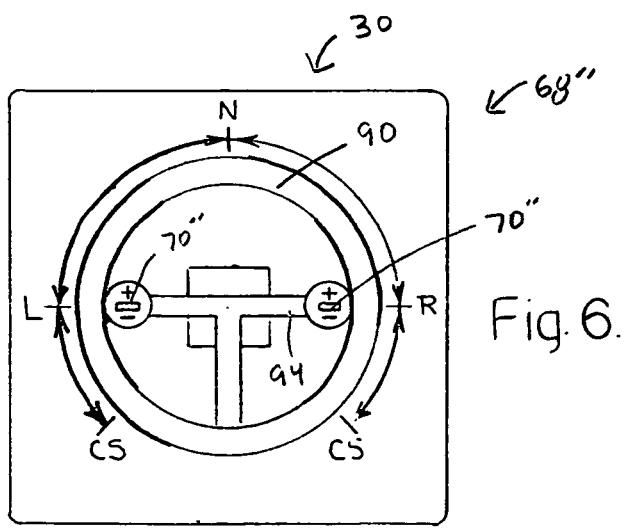
FIG. 6 is an enlarged partial view of the steering control for the drive-by-wire lawn mower of FIG. 5.

In a different alternate embodiment, as shown in FIGS. 5, the mower 20 has first and second controllers 66", 68" that operate in a similar manner as the first and second controllers 66', 68'. In this embodiment, the first controller 66", as can be seen in FIG. 7, is a foot pedal 88 that can be operated by a foot of the user of the mower 20 and instructs the microprocessor 64 of whether to propel the mower 20 in a forward or backward direction, and the second controller 68", as can be seen in FIG. 6, is a steering wheel 90 that instructs the microprocessor 64 of the direction in which to steer the mower 20.

The foot pedal 88 pivots about an axis 92 between forward and reverse positions. A neutral position is interposed between the forward and reverse positions and, preferably, the foot pedal 88 is biased so that the foot pedal 88 is in the neutral position when no force is being exerted on the foot pedal 88. Operation of the foot pedal 88 is identical to operation of the first controller 66', discussed above, the only difference being that the foot pedal 88 is rotated about a pivot axis 92 between the forward and reverse positions while the first controller 66' was moved linearly between the forward and reverse positions. In other words, rotation of the foot pedal 88 toward the forward position sends signals to the microprocessor 64 that instruct the microprocessor 64 to drive the first and second driven wheels 52, 54 in a direction that corresponds to propelling the mower 20 in a forward direction and, conversely, the pivoting of the foot pedal 88 toward the reverse position causes the foot pedal 88 to send signals to microprocessor 64 that instruct the microprocessor 64 to drive the first and second driven wheels 52, 54 in a direction that corresponds to propelling the mower 20 in a backward direction. Like the first controller 66', movement of the foot pedal 88 from the neutral position toward the forward and reverse positions causes a proportional increase in the speed of rotation of the first and second driven wheels 52, 54 in response to movement of the foot pedal 88 from the neutral position toward the forward and reverse positions. Additionally, the proportional increase in the speed of rotation of the first and second wheels 52, 54 is larger as the foot pedal 88 pivots toward the forward position then when the foot pedal 88 pivots toward the reverse position so that the mower 20 is capable of being propelled faster in the forward direction then in the backward direction.

The steering wheel 90 rotates between left and right positions with a neutral position interposed between the left and right positions. The operation of steering wheel 90 is very similar to the operation of the second controller 68' with a difference being that the steering wheel 90 rotates between positions while the second controller 68' moved linearly between positions. The steering wheel 90 has a sensor (not shown) that informs the microprocessor 64 of the position of the steering wheel 90, as is known in the art. Rotation of the steering wheel 90 from the neutral position and toward the left position causes the first and second driven wheels 52, 54 to rotate at different rates so that the mower turns to the left and, conversely, rotation of the steering wheel 90 from the neutral position and toward the right position causes the first and second driven wheels 52, 54 to rotate at different rates so that the mower turns to the right. Preferably, the steering wheel 90 is biased to return to the neutral position so that when no force is applied to the steering wheel 90, the mower 20 will move in a straight direction when being propelled.

Preferably, rotation of the steering wheel 90 from the neutral position toward the left and right positions causes the difference in the rate of rotation of the first and second driven wheels 52, 54 to increase in proportion to the rotation of the steering wheel 90 from the neutral position. Even more preferably, the steering wheel 90 can be selectively rotated between extreme left and extreme right positions that are disposed beyond the respective left and right positions so that the steering wheel 90 must move pass the left and right positions to reach the respective extreme left and extreme right positions. Rotation of the steering wheel 90 pass the left position toward the extreme left position causes the mower 20 to counter steer to the left and, conversely, rotation of the steering wheel 90 pass the right position toward the extreme right position causes the mower 20 to counter steer to the right. Preferably, the rotation of the steering wheel 90 pass the left and right positions toward the respective extreme left and extreme right positions causes a speed of the counter steer to increase in proportion to the rotation of the steering wheel 90 pass the left and right positions.

As was discussed above with respect to the second controller 68', the steering wheel 90 preferably provides a tactile sensation to a user of the mower 20 when the steering wheel 90 is rotated pass the left and right positions so that a user of the mower 20 will feel the tactile sensation prior to the mower 20 performing a counter steering operation. The tactile sensation can be provided by a variety of ways, as will be apparent to those skilled in the art. For example, the steering wheel 90 can have detents that are positioned along the range of rotation of the steering wheel 90 so that when the steering wheel 90 enters a specific position, the user of the mower 20 feels a change in the effort required to rotate the steering wheel 90. A cammed surface can be provided so that as the steering wheel 90 is rotated off center (away from the neutral position), the resistance to rotation of the steering wheel 90 is increased and the effort required to rotate the steering wheel 90 increases. When the rotation of the steering wheel 90 gets to the end of the left and right positions, the cammed surface can have a larger angle so that the force required to further rotate steering wheel 90 is further increased in the counter steering region. If the increase in the steering force required to rotate the steering wheel 90 is significantly large enough, the change from steering left or right to counter steering left or counter steering right will be easily discernable to a user of the mower 20.

Optionally, the steering wheel 90, like the second controller 68', can be provided with one of more biasing switches 70". The one or more biasing switches 70" can be positioned on spokes 94 of the steering wheel 90. The biasing switches 70" can be selectively operated by a user of the mower 20. The biasing switches 70", as was discussed above, provide signals to the microprocessor 64 that the microprocessor 64 uses to fine tune the control of the first and second driven wheels 52, 54 so that the mower 20 can track a desired path. The steering wheel 90 can have two biasing switches 70" to separately fine tune the control of the first and second driven wheels 52, 54. For example, the biasing switch 70" located on the right side of the steering wheel 90 can be configured to fine tune the operation of the driven wheel on the right side of the mower 20 in response to rotation of the steering wheel 90 toward the right position and the biasing switch 70" located on the left side of the steering wheel 90 can be configured to fine tune the operation of the driven wheel on the left side of the mower 20 in response to rotation of the steering wheel 90 toward the left position. That is, the operation of the biasing switches 70" adjusts how the microprocessor 64 controls the operation of the first and second valves 40, 42 in response to the position of the steering wheel 90. The operation of the biasing switches 70" thereby allows the mower 20 to be adjusted so that the mower 20 can properly track a desired path. Optionally, the biasing switches 70" can be a single biasing switch 70" that functions identical to the biasing switch 70' discussed above in relation to the second controller 68'.

The steering wheel 90 can be positioned on the mower 20 in a variety of locations. For example, as shown in FIG. 5, the steering wheel 90 can be mounted on a pedestal 96 that is positioned between the legs of a user on the mower 20, as is known in the art. Optionally, the steering wheel 90 can be on a plate (not shown) having a hinge that allows the steering wheel 90 to be mounted next to one of the arms 76, 78 of the mower 20 and to be selectively flipped up and down in front of a user seated in the seat 26 of mower 20.

Because the steering wheel 90 is not mechanically linked to the wheels 22 of the mower 20, the steering wheel 90 can be positioned in a variety of manners and in a variety of locations that are convenient for the user of the mower 20.

Figure 2D:
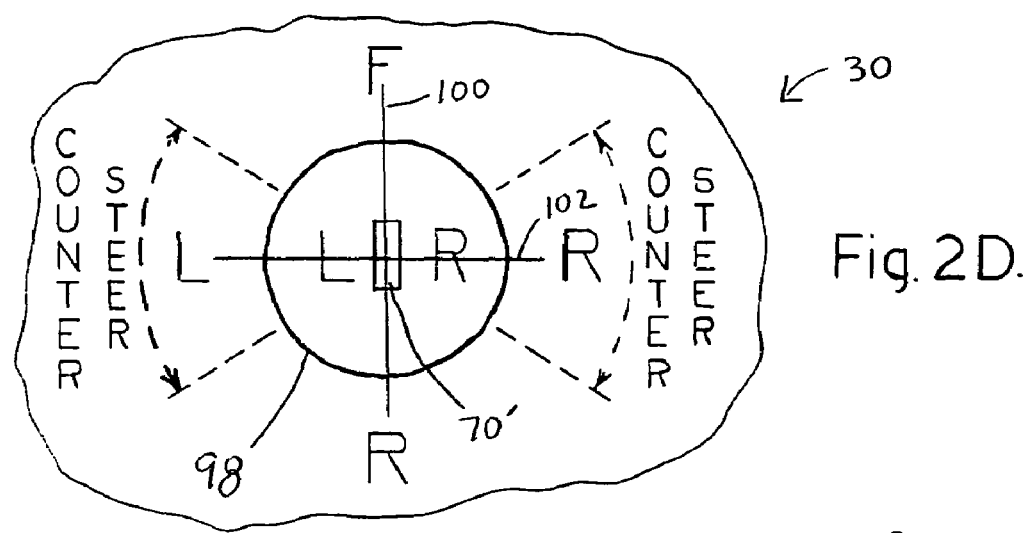
FIG. 2D is an enlarged partial view of a different alternate embodiment for the controllers of the drive-by-wire lawn mower of FIG. 1.

In a different preferred embodiment, the one or more controllers 30 comprises a single controller 98 as shown in FIG. 2D. The single controller 98 is selectively moveable in two axes and sends signals to the microprocessor 64 that the microprocessor 64 uses to control the operation of the first and second driven wheels 52, 54. Movement of the single controller 98 along a first axis 100 corresponds to instructing the microprocessor 64 to control the operation of the first and second driven wheels 52, 54 so that the mower 20 is propelled in a forward or backward direction. Movement of the single controller 98 along a second axis 102 corresponds to instructing the microprocessor 64 to control the operation of the first and second driven wheels 52, 54 so that the mower 20 steers to the left or right. Movement of the single controller 98 along the first and second axes 100, 102 provides a range of movement along a plane in which the single controller 98 can be positioned. Movement of the single controller 98 along the plane corresponds to desired operation of the mower 20. The single controller 98 provides signals to the microprocessor 64 that informs the microprocessor 64 of the location of the single controller 98 within the plane. The plane is divided into areas that correspond to different operations of the mower 20. The operation of the mower 20 in response to the location of the single controller 98 within the plane is programmed into the microprocessor 64. Preferably, movement of the single controller 98 linearly along the first axis 100 will cause the mower 20 to be propelled in either a forward or backward direction. If the single controller 98 deviates from traveling linearly along the first axis 100 so that the single controller 98 travels along the second axis 102, the mower 20 will perform a steering operation along with being propelled in either the forward or reverse direction. If the single controller 98 is moved along the second axis 102 a sufficient distance, the mower 20 will perform a counter steering operation to the left or right. Optionally, but preferably, the single controller 98 can also be provided with a biasing switch that is identical to the biasing switch 70' on the second controller 68'. The biasing switch 70' on the single controller 98 enables a user of the lawn mower 20 to fine tune the operation of the first and second driven wheels 52, 54 so that the mower 20 can properly track a desired path. The boundaries of the predetermined positions of the single controller 98 that instruct the microprocessor 64 whether to propel the mower in a forward, backward, steer right, steer left, counter steer right or counter steer left operation can be adjusted by programming the microprocessor 64. This enables a user of the mower 20 to customize the operation of the single controller 98 to meet individual preferences.

The one or more controllers 30 can communicate with the microprocessor 64 in a variety of manners. Preferably, the one or more controllers 30 are connected to the microprocessor 64 by electrical wires (not shown). The use of electrical wires to connect the one or more controllers 30 to the microprocessor 64 eliminates the need for complex mechanical linkages to control the operation of the mower 20. The use of electrical wires also facilitate the mounting of the one or more controllers 30 in locations that are convenient to the user of the mower 20. Optionally, the one or more controllers 30 can communicate with the microprocessor 64 via wireless communication such as by RF signals, infrared signals and other ways that will be apparent to those skilled in the art. Therefore, the one or more controllers 30 can be connected to the microprocessor 64 by a variety of means and still be within the scope of the invention as defined by the claims.

The specific one or more controllers 30 that are used on the mower 20 can be varied to meet the needs of a user of the mower 20. For example, the first controllers 66', 66" are generally interchangeable and can be used with either of the second controllers 68', 68". Likewise, the second controllers 68', 68" are also interchangeable and can be used with either of the first controllers 66', 66". The mower 20 can have a combination of first and second controllers such that a user 20 is provided with numerous and redundant ways of controlling the operation of the mower 20. For example, the mower 20 can be provided with the first and second controllers 66, 68 along with the first and second controller 66", 68" or can be provided with a single controller 98 along with the first and second controllers 66", 68" to provide a user of the mower 20 with various options on how to control the operation of the mower 20. It should be understood that the above examples are for illustrative purposes only and that the above described controllers can be combined in a variety of ways that go beyond those illustrated and discussed and that will be apparent to those skilled in the art and still be within the scope of the invention as defined by the claims. Therefore, the combination of the one or more controllers 30 should not be limited to those specifically used as illustrating the possibilities of combining the various one or more controllers 30.

The flexibility and variety in which the one or more controllers 30 can be provided on the mower 20 enables a person to customize the mower 20 and also allows the mower 20 to be operated by a person that is physically handicapped. For example, if the user of the mower 20 has only a single arm, the mower 20 can be provided with the foot pedal 88 and the steering wheel 90 or with the single controller 98 so that the single armed user can operate the mower 20. If the user does not have any legs, the mower 20 can be provided with the first and second controller 66, 68 or 66', 68' or 66', 68" or a single controller 98 so that the legless user can operate the mower 20.

The microprocessor 64 can be programmed to control the operation of the first and second driven wheels 52, 54 so that the mower 20 can be safely operated and prevented from injuring any turf on which the mower 20 is operated. Preferably, the microprocessor 64 controls the acceleration and deceleration of the first and second driven wheels 52, 54 in response to signals received from the one or more controllers 30 in a controlled manner that prevents abrupt movement of the mower 20 that could upset a user riding on the mower 20 or cause an overload condition to exist on the turf which will cause one or more of the wheels 22 on the mower 20 to injure the turf. For example, when the one or more controllers 30 instruct the microprocessor 64 to perform a counter steering operation, the microprocessor 64 will start by slowing down the mower 20 and allowing one of the first or second driven wheels 52, 54 to continue to rotate forwardly while the opposite first or second driven wheel 52, 54 slows down, stops and goes into reverse. In order to avoid sudden and unexpected accelerations upon the mower 20 or the user of the mower 20, this is a controlled deceleration of the first or second driven wheel 52, 54 to its stopped position and then a controlled acceleration of the first or second driven wheel 52, 54. Because the first or second driven wheel 52, 54 is now going in reverse, it will never be allowed to go as fast as the opposite first or second driven wheel 52, 54 that is going in a forward direction. By controlling the deceleration and acceleration of the first or second driven wheels 52, 54 in the counter steering situation, the mower 20 not only avoids sudden maneuvers which might catch the user of the mower 20 off guard, but the turf underneath the first or second driven wheels 52, 54 is not subjected to overload forces which could easily result in the corrugated tread on the first or second driven wheels 52, 54 tearing up the turf underfoot, particularly when the turf is wet. The microprocessor 64 thereby provides for the safe control and operation of the mower 20 along with preventing a counter steering operation from causing overload forces to act on the turf on which the mower 20 is operating.

The programming of the microprocessor 64 can be provided by a control box (not shown). It can have a display that enables various thresholds, set points and gains to be programmed into the microprocessor 64. Any suitable control box may be utilized, as will be apparent to those skilled in the art. For example, the OPTIMIZER unit from OEM Controls, Inc. can be used to control the operation and programming of the microprocessor 64. The use of a control box enables the control and operation of the mower 20 to be customized by the user of the mower 20.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A drive-by-wire dual path hydraulically driven riding lawn mower, the mower comprising:

first and second hydraulic pumps, the first and second hydraulic pumps providing respective first and second flows of hydraulic fluid;

first and second hydraulically driven wheels that operate independently and are capable of bi-directional rotation, the first and second wheels being independently rotated by the respective first and second flows of hydraulic fluid, and the independent rotation of the first and second wheels propelling and steering the mower;

a microprocessor, the microprocessor controlling the operation of the first and second wheels by controlling the first and second flows of hydraulic fluid to the respective first and second wheels in accordance with signals received by the microprocessor;

at least one controller, the at least one controller sending signals to the microprocessor that the microprocessor uses to control the operation of the first and second wheels so that operation of the at least one controller causes the first and second wheels to propel and steer the mower; and first and second proportional servo valves, the first and second valves controlling a direction and volume of flow of the respective first and second flows of hydraulic fluid in response to signals received from the microprocessor, the controlling of the direction and volume of flow of the first and second flows of hydraulic fluid controlling a direction and speed of rotation of the respective first and second wheels; wherein the at least one controller further includes:

a first controller that sends signals to the microprocessor that the microprocessor uses to control the operation of the first and second wheels, the signals from the first controller informing the microprocessor of whether the mower is to be propelled in a forward or backward direction; and a second controller that sends signals to the microprocessor that the microprocessor uses to control the operation of the first and second wheels, the signals from the second controller informing the microprocessor of a direction in which the mower is to be steered.

2. The mower of claim 1, wherein:
the first controller is selectively moveable between forward and reverse positions and wherein movement of the first controller toward the forward position causing the first and second wheels to rotate in a direction that corresponds to propelling the mower in a forward direction and movement of the first controller toward the reverse position causing the first and second wheels to rotate in a direction that corresponds to propelling the mower in a backward direction;
the second controller is selectively moveable between left and right positions and wherein movement of the second controller toward the left position causing the first and second wheels to rotate at different speeds so that the mower turns to the left and movement of the second controller toward the right position causing the first and second wheels to rotate at different speeds so that the mower turns to the right.

3. The mower of claim 2, wherein the first controller has a neutral position disposed between the forward and reverse positions and positioning of the first controller in the neutral position causes the first and second wheels to not be driven.

4. The mower of claim 3, wherein the first controller is biased to the neutral position so that the first controller is positioned in the neutral position when no force is being applied to the first controller.

5. The mower of claim 3, wherein movement of the first controller from the neutral position toward the forward and reverse positions causes the speed of rotation of the first and second wheels to increase in proportion to the movement of the first controller from the neutral position.

6. The mower of claim 5, wherein the proportional increase in the speed of rotation of the first and second wheels in response to movement of the first controller from the neutral position toward the forward position is greater than the proportional increase in the speed of rotation of the first and second wheels in response to movement of the first controller from the neutral position toward the reverse position so that the mower is capable of being propelled faster in the forward direction than in the backward direction.

7. The mower of claim 3, wherein the first controller is a joystick that moves linearly between the forward and reverse positions.

8. The mower of claim 3, wherein the first controller is a foot pedal that rotates about an axis between the forward and reverse positions.

9. The mower of claim 2, wherein the second controller has a neutral position disposed between the left and right positions and positioning of the second controller in the neutral position causes the second controller to not effect the speed at which each of the first and second wheels rotate.

10. The mower of claim 9, wherein the second controller is biased to the neutral position so that the second controller is positioned in the neutral position when no force is being applied to the second controller.

11. The mower of claim 9, wherein movement of the second controller from the neutral position toward the left and right positions causes a difference in the speed of rotation of the first and second wheels to increase in proportion to the movement of the second controller from the neutral position.

12. The mower of claim 9, wherein the second controller is selectively moveable between extreme left and extreme right positions, the extreme left and extreme right positions being disposed beyond the respective left and right positions so that the second controller must move past the left and right positions to reach the respective extreme left and extreme right position and movement of the second controller past the left position toward the extreme left position causes the mower to counter steer left and movement of the second controller past the right position toward the extreme right position causes the mower to counter steer right.

13. The mower of claim 12, wherein movement of the second controller past the left and right positions toward the respective extreme left and extreme right positions causes a speed of the counter steer to increase in proportion to the movement of the second controller past the left and right positions.

14. The mower of claim 12, wherein movement of the second controller past the left and right positions toward the respective extreme left and extreme right positions provides a tactile sensation so that an operator of the mower will feel the tactile sensation prior to the mower counter steering.

15. The mower of claim 12, wherein the second controller is a steering wheel that rotates and rotation of the steering wheel causes the second controller to move between the extreme left and extreme right positions.

16. The mower of claim 12, wherein the second controller is a joystick that moves linearly between the extreme left and extreme right positions.

17. A drive-by-wire dual path hydraulically driven riding lawn mower, the mower comprising:
first and second hydraulic pumps, the first and second hydraulic pumps providing respective first and second flows of hydraulic fluid;
first and second hydraulically driven wheels that operate independently and are capable of bi-directional rotation, the first and second wheels being independently rotated by the respective first and second flows of hydraulic fluid, and the independent rotation of the first and second wheels propelling and steering the mower;
a microprocessor, the microprocessor controlling the operation of the first and second wheels by controlling the first and second flows of hydraulic fluid to the respective first and second wheels in accordance with signals received by the microprocessor;
at least one controller, the at least one controller sending signals to the microprocessor that the microprocessor uses to control the operation of the first and second wheels so that operation of the at least one controller causes the first and second wheels to propel and steer the mower; and
first and second valves, the first and second valves controlling a direction and volume of flow of the respective first and second flows of hydraulic fluid in response to signals received from the microprocessor, the controlling of the direction and volume of flow of the first and second flows of hydraulic fluid controlling a direction and speed of rotation of the respective first and second wheels,
wherein the first and second driven wheels are the only driven wheels.

18. A drive-by-wire dual path hydraulically driven riding lawn mower, the mower comprising:
first and second hydraulic pumps, the first and second hydraulic pumps providing respective first and second flows of hydraulic fluid;
first and second hydraulically driven wheels that operate independently and are capable of bi-directional rotation, the first and second wheels being independently rotated by the respective first and second flows of hydraulic fluid, and the independent rotation of the first and second wheels propelling and steering the mower;

a microprocessor, the microprocessor controlling the operation of the first and second wheels by controlling the first and second flows of hydraulic fluid to the respective first and second wheels in accordance with signals received by the microprocessor;

a first controller that sends signals to the microprocessor that the microprocessor uses to control the operation of the first and second wheels, the signals from the first controller informing the microprocessor of whether the mower is to be propelled in a forward or backward direction;

a second controller that sends signals to the microprocessor that the microprocessor uses to control the operation of the first and second wheels, the signals from the second controller informing the microprocessor of a direction in which the mower is to be steered; and first and second valves, the first and second valves controlling a direction and volume of flow of the respective first and second flows of hydraulic fluid in response to signals received from the microprocessor, the controlling of the direction and volume of flow of the first and second flows of hydraulic fluid controlling a direction and speed of rotation of the respective first and second wheels.

19. The mower of claim 18, wherein:
the first controller is selectively moveable between forward and reverse positions, wherein movement of the first controller toward the forward position causing the first and second wheels to rotate in a direction that corresponds to propelling the mower in a forward direction and movement of the first controller toward the reverse position causing the first and second wheels to rotate in a direction that corresponds to propelling the mower in a backward direction; and the second controller is selectively moveable between left and right positions, wherein movement of the second controller toward the left position causing the first and second wheels to rotate at different speeds so that the mower turns to the left and movement of the second controller toward the right position causing the first and second wheels to rotate at different speeds so that the mower turns to the right.

20. The mower of claim 19, wherein:
the first controller has a neutral position disposed between the forward and reverse positions; and
positioning of the first controller in the neutral position causes the first and second wheels to not be driven.

21. The mower of claim 20, wherein the first controller is biased to the neutral position so that the first controller is positioned in the neutral position when no force is being applied to the first controller.

22. The mower of claim 20, wherein movement of the first controller from the neutral position toward the forward and reverse positions causes the speed of rotation of the first and second wheels to increase in proportion to the movement of the first controller from the neutral position.

23. The mower of claim 22, wherein the proportional increase in the speed of rotation of the first and second wheels in response to movement of the first controller from the neutral position toward the forward position is greater than the proportional increase in the speed of rotation of the first and second wheels in response to movement of the first controller from the neutral position toward the reverse position so that the mower is capable of being propelled faster in the forward direction than in the backward direction.

24. The mower of claim 18, wherein the first controller is a joystick that moves linearly between the forward and reverse positions.

25. The mower of claim 18, wherein the first controller is a foot pedal that rotates about an axis between the forward and reverse positions.

26. The mower of claim 18, wherein the second controller has a neutral position disposed between the left and right positions and positioning of the second controller in the neutral position causes the second controller to not effect the speed at which each of the first and second wheels rotate.

27. The mower of claim 26, wherein the second controller is biased to the neutral position so that the second controller is positioned in the neutral position when no force is being applied to the second controller.

28. The mower of claim 26, wherein movement of the second controller from the neutral position toward the left and right positions causes a difference in the speed of rotation of the first and second wheels to increase in proportion to the movement of the second controller from the neutral position.

29. The mower of claim 26, wherein the second controller is selectively moveable between extreme left and extreme right positions, the extreme left and extreme right positions being disposed beyond the respective left and right positions so that the second controller must move past the left and right positions to reach the respective extreme left and extreme right positions and movement of the second controller past the left position toward the extreme left position causes the mower to counter steer left and movement of the second controller past the right position toward the extreme right position causes the mower to counter steer right.

30. The mower of claim 29, wherein movement of the second controller past the left and right positions toward the respective extreme left and extreme right positions causes a speed of the counter steer to increase in proportion to the movement of the second controller past the left and right positions.

31. The mower of claim 29, wherein movement of the second controller past the left and right positions toward the respective extreme left and extreme right positions provides a tactile sensation so that an operator of the mower will feel the tactile sensation prior to the mower counter steering.

32. The mower of claim 29, wherein the second controller is a steering wheel that rotates and rotation of the steering wheel causes the second controller to move between the extreme left and extreme right positions.

33. The mower of claim 29, wherein the second controller is a joystick that moves linearly between the extreme left and extreme right positions.

34. A drive-by-wire riding lawn mower, the mower comprising:
first and second drive units;
first and second driven wheels that operate independently and are capable of bi-directional rotation, the first and second wheels being independently rotationally driven by the respective first and second drive units, and the independent rotation of the first and second wheels propelling and steering the mower;
a microprocessor, the microprocessor controlling the operation of the first and second wheels by controlling the operation of the first and second drive units in accordance with signals received by the microprocessor;

a first controller that sends signals to the microprocessor that the microprocessor uses to control the operation of the first and second wheels, the signals from the first controller informing the microprocessor of whether the mower is to be propelled in a forward or backward direction; and a second controller that sends signals to the microprocessor that the microprocessor uses to control the operation of the first and second wheels, the signals from the second controller informing the microprocessor of a direction in which the mower is to be steered.

35. The mower of claim 34, wherein the drive units include hydraulic pumps.

36. The mower of claim 34, wherein the drive units include electric motors.

* * * * *